UNITED STATES PATENT OFFICE.

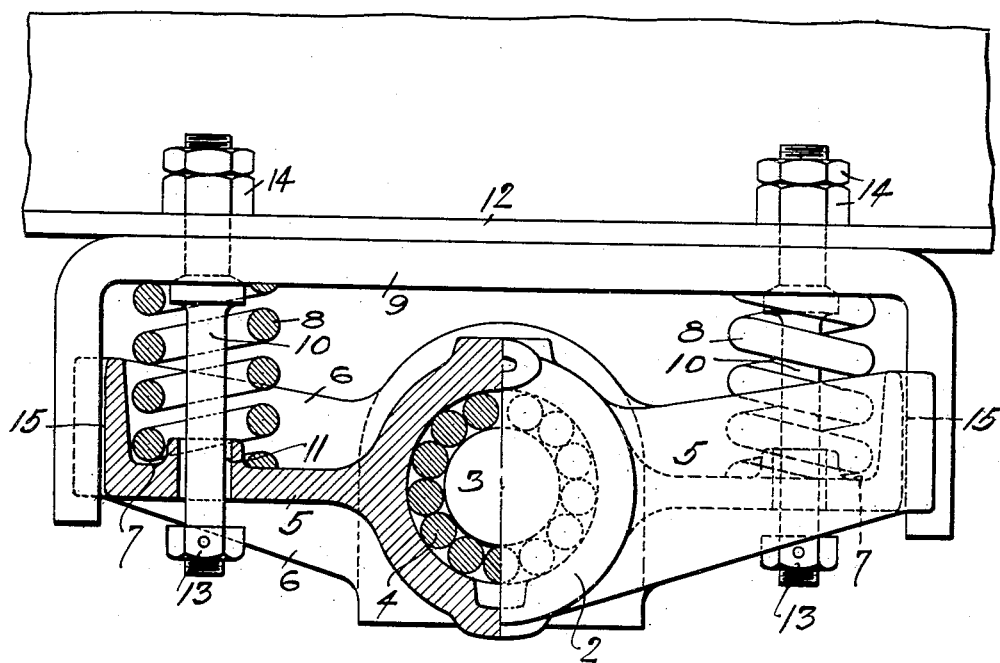

KARL H. HANSEN, OF SEWICKLEY, PENNSYLVANIA, ASSIGNOR, BY MESNE ASSIGNMENTS, TO KOPPEL INDUSTRIAL CAR AND EQUIPMENT COMPANY, OF PITTSBURGH, PENNSYLVANIA, A CORPORATION OF PENNSYLVANIA.

AXLE-BEARING.

1,328,512.      Specification of Letters Patent.      Patented Jan. 20, 1920.

Application filed November 3, 1917. Serial No. 200,062.

*To all whom it may concern:*

Be it known that I, KARL H. HANSEN, a subject of the Emperor of Germany, and a resident of Sewickley, in the county of Allegheny and State of Pennsylvania, have invented a new and useful Improvement in Axle-Bearings; and I do hereby declare the following to be a full, clear, and exact description thereof.

My invention relates to axle-bearings or journal-boxes and more particularly to the type adapted for use in connection with industrial railway-cars.

The object of my invention is to provide a bearing of this character of the spring-type, and at the same time, do away with the expensive pedestals or guides between which the journal-box is located and adapted to move up and down, providing in lieu thereof a very simple and durable form of bearing which can be applied to an ordinary car having a rigid type of bearing without any change in construction.

To these ends my invention comprises the novel features hereinafter set forth and claimed.

In the drawing the figure is an end view in section of my improved bearing.

In the drawing, the numeral 2 designates the bearing-box which has the space between the axle 3, and the inner face of said bearing-box for the friction-rollers 4 where roller-bearings are employed, although it is adapted for ordinary brasses.

The bearing 2 is provided with the wings or extensions 5 projecting out from sides thereof and formed with the strengthening ribs 6 to give the requisite strength. At each end of the wings 5 are the spring seats 7 upon which the springs 8 rest. These springs 8 are interposed between the seat 7 and the inner upper face of the pedestal-strap 9. This pedestal-strap 9 is preferably in the form of an inverted U, and bolts passing up through openings 11 in wings 5 and through openings in the pedestal-strap and bearing-sill 12, secure the bearing-box to the pedestal-strap and to the bearing-sill. These bolts act as guides for the springs and, at the same time, secure the pedestal-strap and journal-box to the sills of the car. Nuts 13 and 14 at the lower and upper ends of said bolts secure the bolts in position, and by tightening up on the nuts 13, it is apparent that the tension of the spring 8 may be regulated.

The outer ends of the wings 5 are recessed as at 15 to receive the downwardly-extending end portions of the pedestal-strap and the end portions of said strap form guides within which the bearing is adapted to move up and down and prevent the displacement of the bearing-box.

By my invention, I provide a simple and inexpensive form of spring bearing with a small number of parts and only requiring two bolts to hold the same in position, while at the same time, the regular pedestals or guides are dispensed with thereby greatly reducing the cost.

By having the bearing-box held in place by these two bolts, the device can be used interchangeably with the ordinary rigid type of bearing which is simply bolted to the sills of the car by two like bolts. In this way, any change in the construction of the car provided with the ordinary rigid bearings is avoided.

What I claim is:

In an axle-bearing or journal-box, the combination of a box having extensions forming spring-seats, an inverted U-shaped pedestal-strap, bolts carried by the car-frame and supporting said box and said strap, and springs surrounding said bolts and interposed between said strap and said spring-seats.

In testimony whereof, I, the said KARL H. HANSEN, have hereunto set my hand.

KARL H. HANSEN.

Witnesses:
C. T. CLARKE,
O. W. ROSS.